(12) United States Patent
Karino et al.

(10) Patent No.: US 8,220,894 B2
(45) Date of Patent: Jul. 17, 2012

(54) IMAGE FORMING APPARATUS, COMMUNICATION DEVICE, AND CARTRIDGE

(75) Inventors: Kenichi Karino, Suntou-gun (JP); Yuuji Takayama, Suntou-gun (JP); Hiroyuki Watanabe, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 12/159,185

(22) PCT Filed: Nov. 7, 2007

(86) PCT No.: PCT/JP2007/072044
§ 371 (c)(1),
(2), (4) Date: Jun. 25, 2008

(87) PCT Pub. No.: WO2008/065885
PCT Pub. Date: Jun. 5, 2008

(65) Prior Publication Data
US 2008/0297820 A1    Dec. 4, 2008

(30) Foreign Application Priority Data
Nov. 29, 2006  (JP) .................................. 2006-322522

(51) Int. Cl.
*G06F 12/00* (2006.01)
(52) U.S. Cl. .................. 347/19; 347/5; 347/9
(58) Field of Classification Search ............... 347/5, 9, 347/19
See application file for complete search history.

(56) References Cited

U.S. PATENT DOCUMENTS

| | | | |
|---|---|---|---|
| 5,481,705 A | 1/1996 | Watanabe et al. | |
| 5,918,011 A | 6/1999 | Watanabe et al. | |
| 6,631,967 B1 * | 10/2003 | Saruta | 347/19 |
| 6,665,501 B2 | 12/2003 | Okada et al. | |
| 2002/0015597 A1 | 2/2002 | Okada et al. | |
| 2002/0021906 A1 | 2/2002 | Yoshizaki et al. | |
| 2002/0182610 A1 | 12/2002 | Okamoto et al. | |
| 2007/0121709 A1 | 5/2007 | Ittogi | |

FOREIGN PATENT DOCUMENTS

| | | |
|---|---|---|
| EP | 1089133 A2 | 4/2001 |
| EP | 1289214 A2 | 3/2003 |
| JP | 2002-40904 A | 2/2002 |
| JP | 2003-248798 A | 9/2003 |

OTHER PUBLICATIONS

Chinese Office Action dated Aug. 11, 2011 in corresponding Chinese Patent Application No. 200780006731.5.

* cited by examiner

*Primary Examiner* — Lam S Nguyen
(74) *Attorney, Agent, or Firm* — Fitzpatrick, Cella, Harper & Scinto

(57) ABSTRACT

This invention provides an image forming apparatus which communicates with a plurality of cartridges without increasing its circuit dimension. To accomplish this, the apparatus includes a control circuit having an output terminal for outputting a clock signal and data signal used to generate a transmission signal to the cartridge, and an input terminal for receiving a transmission signal from the cartridge. The apparatus includes N connectors each having the first electrode which is connected to the first electrode surface of each cartridge, and the second electrode which is connected to the second electrode surface. The apparatus includes a 1-to-N first signal line for connecting the input terminal to the N first electrodes, and a 1-to-N second signal line for connecting the output terminal to the N second electrodes. The apparatus includes N switching units which are interposed between 1-to-N branch points and the second electrodes on the second signal line.

9 Claims, 5 Drawing Sheets

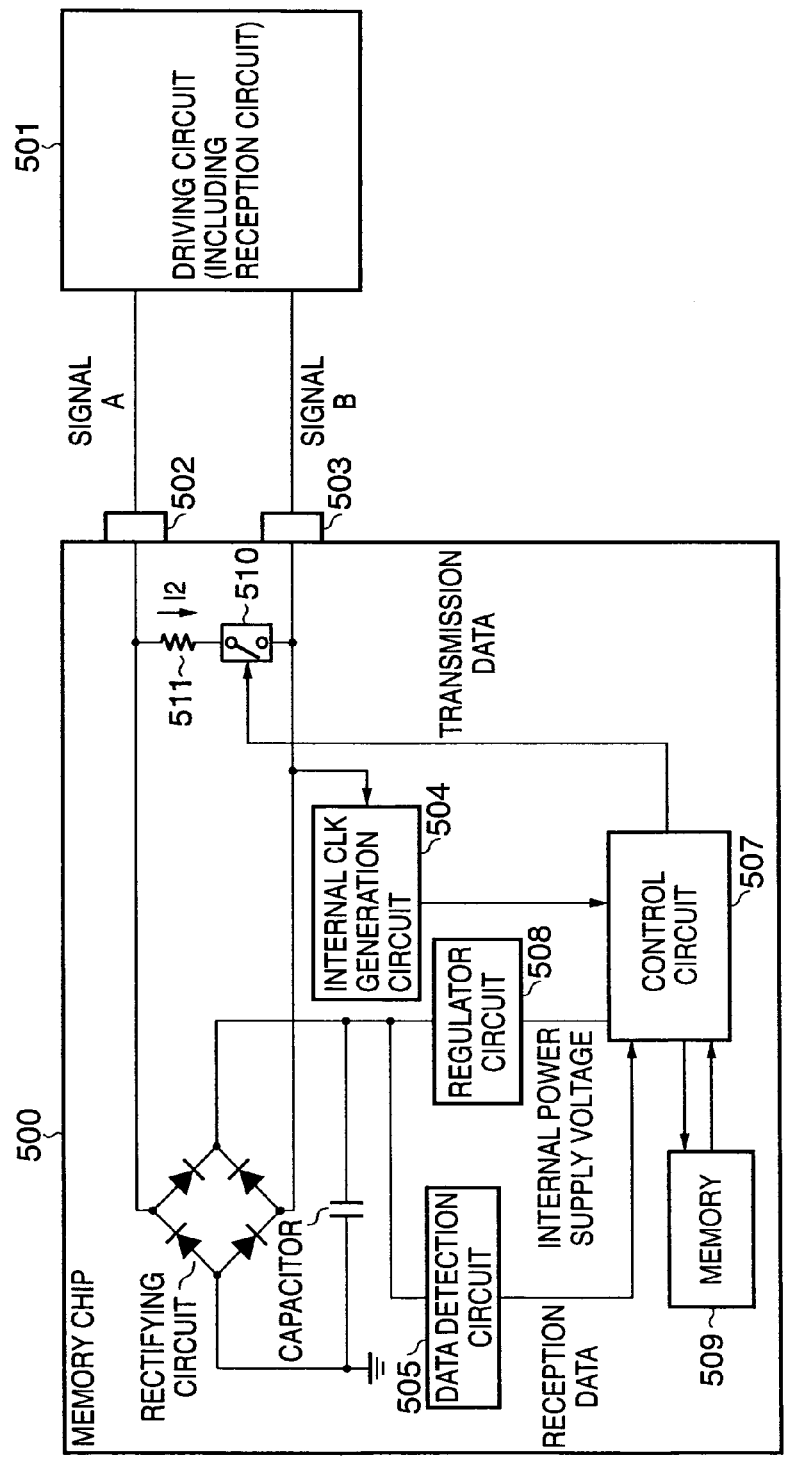

IMAGE FORMING APPARATUS, COMMUNICATION DEVICE, AND CARTRIDGE

CROSS-REFERENCE TO RELATED APPLICATION

This application is a National Stage Application under 35 U.S.C. §371 of International Application No. PCT/JP2007/072044, filed on Nov. 7, 2007, which claims the benefit of Japanese Patent Application No. 2006-322522, filed on Nov. 29, 2006, the contents of each of which are hereby incorporated by reference.

TECHNICAL FIELD

The present invention relates to an image forming apparatus for communicating data with a unit which is detachable from an electronic apparatus such as an image forming apparatus and has a storage medium.

BACKGROUND ART

Recently, information management for quality, distribution, and the like is done by storing individual information in an enormous number of products and rewriting the information by communication between these products and terminals or the like.

Considering the number of products, their use environment, and the like, it is desirable to simplify the internal circuit of a transmission/reception device attached to each product and that of a transmission/reception device in the terminal in terms of downsizing, cost reduction, and durability.

Japanese Patent Laid-Open No. 2003-248798 discloses a contact type transmission/reception apparatus which performs two-way data communication using two signal lines between a printer and the memory chip of a cartridge. The contact type transmission/reception apparatus described in this reference minimizes the number of signal lines to decrease the number of contact connectors of the printer and that of contact electrode surfaces of the cartridge. This is advantageous to cost and downsizing. In general, contact type communication is effective between a printer and a cartridge because the cartridge need not be inserted/removed frequently and wear hardly occurs. A contact type apparatus for communication between a printer and a cartridge can effectively reduce radiation noise at lower cost than by a non-contact type apparatus which communicates using radio waves.

A printer which prints color images incorporates a plurality of cartridges which store toners or inks in a plurality of colors. The printer needs to communicate with a plurality of memory chips attached to these cartridges. However, Japanese Patent Laid-Open No. 2003-248798 does not describe either a method or arrangement for communication with memory chips. For example, a transmission/reception apparatus requiring driving circuits equal in number to memory chips is expected to increase its circuit dimension and greatly raise the cost.

DISCLOSURE OF INVENTION

The present invention enables realization of an image forming apparatus which communicates with a plurality of cartridges without increasing its circuit dimension.

According to one aspect of the present invention, an image forming apparatus which allows detachably mounting a plurality of cartridges having memories for storing information, and communicates with the respective memories of the plurality of cartridges, the apparatus comprising:
a data transmission unit adapted to transmit a data signal to the memories of the plurality of cartridges;
a plurality of signal lines adapted to output the data signal from the data transmission unit to the memories of the plurality of cartridges;
a control unit adapted to output the data signal to the data transmission unit; and
switching units adapted to transmit the data signal from the data transmission unit to one of the memories of the plurality of cartridges by connecting the data transmission unit to one of the plurality of signal lines in accordance with a signal output from the control unit.

According to another aspect of the present invention, a communication device which communicates data in contact with a plurality of cartridges having first contacts and second contacts, the device comprising:
a data transmission unit adapted to transmit a data signal to memories of the plurality of cartridges;
a plurality of signal lines adapted to output the data signal from the data transmission unit to the memories of the plurality of cartridges;
a control unit adapted to output the data signal to the data transmission unit; and
switching units adapted to transmit the data signal from the data transmission unit to one of the memories of the plurality of cartridges by connecting the data transmission unit to one of the plurality of signal lines in accordance with a signal output from the control unit.

According to still another aspect of the present invention, a cartridge detachably mounted in an image forming apparatus, comprising:
a first contact and second contact adapted to connect via two communication lines to a communication device included in the image forming apparatus; and
a memory chip adapted to be connected to the first contact and the second contact,
the memory chip including a constant current circuit whose operation state changes based on a data signal transmitted from the cartridge to the communication device.

Further features of the present invention will be apparent from the following description of exemplary embodiments with reference to the attached drawings.

BRIEF DESCRIPTION OF DRAWINGS

FIG. 5 is a diagram showing an arrangement of a memory chip as a comparative example.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

<Image Forming Apparatus>

Figure 1:
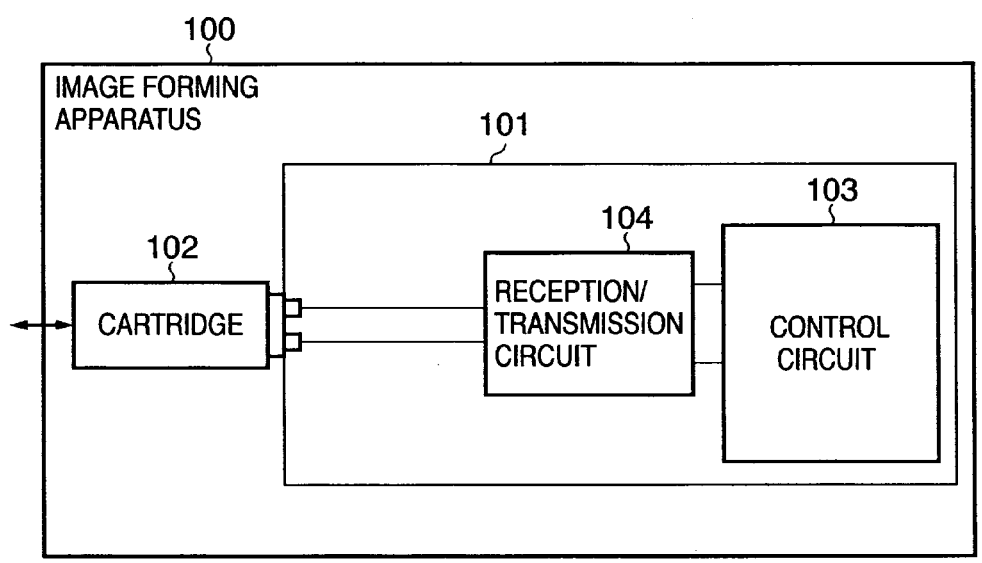
FIG. 1 is a block diagram showing an arrangement of an image forming apparatus as a comparative example.

FIG. 1 is a block diagram showing an arrangement of an image forming apparatus as a comparative example. The arrangement of a communication device 101 incorporated in an image forming apparatus 100 as the comparative example, and one cartridge 102 detachable from the image forming apparatus 100 will be explained. The communication device 101 and cartridge 102 are in physical contact with each other, and communicate data via two signal lines.

The communication device 101 mainly includes a control circuit 103, a reception/transmission circuit 104 including a reception circuit and a driving circuit serving as a transmission circuit, and a connector. The cartridge 102 includes a memory chip having a memory and an interface for communicating data. The control circuit 103 controls data communication with the cartridge 102. The reception/transmission circuit 104 communicates data with the memory chip based on a signal output from the control circuit 103. The reception/transmission circuit 104 performs data communication using two signal lines, and thus executes all of power supply to the memory chip, clock supply for communication synchronization, and data transmission/reception.

The memory chip has an electrode surface which contacts the connector when the cartridge 102 is inserted into the image forming apparatus 100. The connector and electrode surface ensure a communication line between the communication device 101 and the cartridge 102. As the number of communication lines decreases, the number of connectors 105 and that of electrode surfaces of the memory chip decrease. Hence, it is advantageous to cost and downsizing of the system to minimize the number of communication lines to, for example, two. Considering the demand for downsizing, the battery life when a battery is attached, and the like, the memory chip does not have any power supply and receives power from the external reception/transmission circuit 104.

However, a plurality of (N) cartridges is inserted into a color image forming apparatus or the like. If a color image forming apparatus adopts the arrangement in FIG. 1 without any change, it requires N reception/transmission circuits 104. Note that N is a natural number greater than or equal to 2. If the number of internal reception/transmission circuits 104 increases, this leads to a large circuit dimension and high cost. An image forming apparatus according to the embodiment from which N cartridges are detachable will be described. The image forming apparatus according to the embodiment implements data communication with the cartridges using two signal lines without increasing the number of internal driving circuits.

Figure 2:
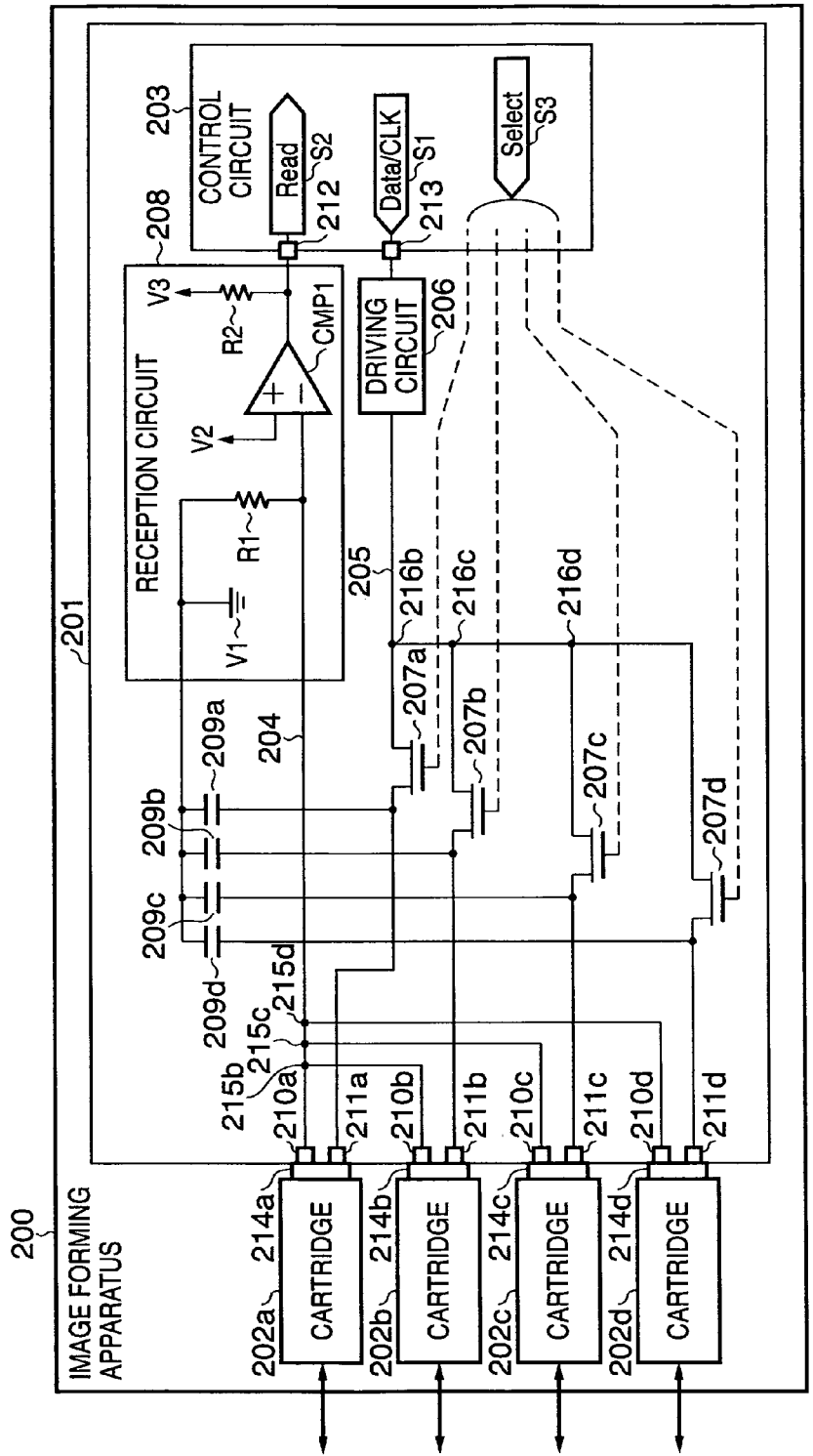
FIG. 2 is a diagram showing an example of an image forming apparatus according to an embodiment.

FIG. 2 is a diagram showing an example of the image forming apparatus according to the embodiment. The arrangement of a communication device 201 incorporated in an image forming apparatus 200 according to the embodiment, and N cartridges 202, that is, 202a, 202b, 202c, and 202d detachable from the image forming apparatus 200 will be explained. In the following description, the number (N) of detachable cartridges 202 is four.

The communication device 201 comprises four connectors, a control circuit 203 functioning as a control unit which controls communication with a cartridge, a driving circuit 206 functioning as a data transmission unit which transmits data, and a reception circuit 208 functioning as a data reception unit which receives data. The cartridges 202a, 202b, 202c, and 202d comprise memory chips 214, that is, 214a, 214b, 214c, and 214d, respectively. Each of the memory chips 214a, 214b, 214c, and 214d has two electrode surfaces (first and second electrode surfaces: not shown).

The connectors have first electrodes 210, that is, 210a, 210b, 210c, and 210d which are connected to the first electrode surfaces serving as the first contacts, and second electrodes 211, that is, 211a, 211b, 211c, and 211d which are connected to the second electrode surfaces serving as the second contacts. The connectors are connected to the memory chips 214a, 214b, 214c, and 214d. For example, a connector which is connected to the memory chip 214a has the first electrode 210a and second electrode 211a, and a connector which is connected to the memory chip 214b has the first electrode 210b and second electrode 211b. When the cartridge 202 is mounted in the image forming apparatus 200, the electrode surface of the cartridge 202 contacts the electrode of the communication device 201 to form (connect) a communication line. When the cartridge 202 is demounted from the image forming apparatus 200, the communication line is physically disconnected. The image forming apparatus allows mounting M (M is a natural number) cartridges, and thus has M connectors. However, only N cartridges equal to or smaller than M cartridges may also be connected to the image forming apparatus. In this case, M-N connectors are not connected. Normally, M=N.

The control circuit 203 has an output terminal 213 for outputting a clock signal and data signal used to generate a transmission signal to the cartridge 202, and an input terminal 212 for receiving a transmission signal from the cartridge 202. The communication device 201 has a 1-to-N first signal line 204 for connecting the input terminal 212 of the control circuit 203 to N first electrodes 210. The communication device 201 also has a 1-to-N second signal line 205 for connecting the output terminal 213 to the second electrodes 211. More specifically, the first signal line 204 branches from branch points 215b, 215c, and 215d, and is connected to each first electrode 210. The second signal line 205 branches from branch points 216, that is, 216b, 216c, and 216d, and is connected to each second electrode 211.

The communication device 201 further comprises four switching units 207, that is, 207a, 207b, 207c, and 207d which are interposed between the branch points 216 and the second electrodes 211 on the second signal line. The switching units 207a, 207b, 207c, and 207d connect/disconnect the second electrodes 211 to/from the output terminal 213 based on a switching signal S3 output from the control circuit 203. The switching signal is also used to alternatively select a cartridge serving as a communication partner, and may also be called a selection signal. More specifically, the control circuit 203 controls the switching unit 207a to the connection state and the switching units 207b, 207c, and 207d to the disconnection state based on the switching signal S3. In this case, the communication device 201 communicates data with the cartridge 202a. The communication device 201 according to the embodiment can selectively communicate data with one of the cartridges 202 by changing one of the switching units 207a to 207d to the connection state and the others to the disconnection state.

The switching units 207, that is, 207a to 207d are desirably formed from field-effect transistors (to be referred to as FETs hereinafter). This is because the FET is much smaller in size than a mechanical switch typified by a relay and lower in cost than a selector circuit formed from a semiconductor element, and the circuit arrangement and circuit pattern layout can be designed at high degree of freedom.

A principle which allows selective data communication by arranging the switching units 207 on only the second signal line 205 will be explained. Assume that the communication device 201 communicates data with the cartridge 202a in FIG. 2. The control circuit 203 outputs the switching signal S3 to enable the gate signal of the FET serving as the switching unit 207a. The control circuit 203 disables the gate signals of the FETs serving as the switching units 207b, 207c, and 207d. As a result, only the memory chip 214a is connected to the second signal line 205. The remaining memory chips 214b, 214c, and 214d are connected to only the first signal line 204, and the second signal line 205 is open to them. The first and second electrode surfaces of the memory chips 214b, 214c, and 214d have no difference in potential. Only the memory chip 214a becomes active, and the memory chips 214b, 214c, and 214d become inactive. In this way, the image forming apparatus 200 according to the embodiment can execute selective data communication by ON/OFF-controlling the switching unit 207 inserted in only one of the two signal lines connected to the memory chip 214 serving as a communication partner.

The driving circuit 206 is interposed between the output terminal 213 and the switching units 207 on the second signal line 205. The driving circuit 206 supplies power via the second signal line 205 to the cartridge 202 whose second electrode 211 is connected by the switching unit 207. The driving circuit 206 outputs a transmission signal based on a clock signal and data signal from the control circuit 203. The transmission signal is obtained by superposing information acquired from the data signal on the clock signal output from the control circuit 203. According to the embodiment, even when the four cartridges 202 are mounted, the image forming apparatus can perform selective data communication with one cartridge 202 selected by the switching unit 207. This obviates the need to arrange four driving circuits 206 in correspondence with the memories of four cartridges.

The reception circuit 208 is interposed between the input terminal 212 and the first electrode 210 on the first signal line 204, and receives a transmission signal from the cartridge 202 corresponding to the second electrode which is connected by the switching unit 207. The reception circuit 208 is commonly connected to the cartridges 202 via the first signal line 204. This arrangement is possible because the image forming apparatus performs selective data communication with one cartridge 202 selected by the switching unit 207. That is, a signal is always output from only the memory chip 214 of one cartridge 202. This obviates the need to arrange four reception circuits 208, and one reception circuit 208 suffices to be connected commonly.

As described above, the communication device 201 according to the embodiment switches the second signal line 205 by the switching unit 207. The control circuit 203 turns off the FETs serving as the switching units 207 to disconnect the second signal line 205 from the memory chips 214 of the cartridges 202 other than a communication partner. In practice, however, even if the FET is turned off, a parasitic capacitance always exists between the drain and source terminals of the FETs. When the driving circuit 206 generates a pulse, even an FET in the OFF state transmits the AC component, and the AC voltage is applied to the memory chip 214 other than a communication partner. To solve this problem, the communication device 201 includes four charge accumulation units. Each charge accumulation unit has one end connected to the first signal line 204, and the other end connected between the second electrode 211 and the switching unit 207 on a corresponding second signal line 205. The embodiment uses, for example, condensers 209, that is, 209a, 209b, 209c, and 209d as the charge accumulation units. By connecting the condensers 209a, 209b, 209c, and 209d, the following approximate expression is established:

$$VM \approx VAB \times \frac{C2}{C1 + C2} \quad (1)$$

For example, VAB represents the voltage difference between a signal A output to the second signal line 205 and a signal B output to the first signal line 204. VM represents the voltage applied between the two terminals of the first and second electrode surfaces of the memory chip 214 other than a communication partner. C1 represents the capacitance of the condenser 209. C2 represents the parasitic capacitance between the drain and source of the FET.

Strictly speaking, a current detection resistor R1 and the internal impedance of the memory chip 214 shown in FIG. 2 need to be considered. However, the approximate calculation ignores these impedances on condition that the impedance of the condenser 209 is reduced. Letting VOFF be the voltage between terminals for reliably stopping (turning off or resetting) a memory chip, the capacitance value of the condenser 209 need to be determined to satisfy VM<VOFF. Letting VOFF=0.1 V, VAB=5 V, and C2=20 pF, the capacitance value C1 is calculated to be 980 pF or more in accordance with expression (1). When the communication frequency is set to about 100 kHz, the impedance of the condenser 209 is calculated to be about 1.6 kΩ. The internal impedance of the memory chip 214 is at least several times this value. The impedance of the condenser 209 is dominant over the synthesized impedance of parallel connection with the condenser 209.

By inserting the 980 pF condenser, the impedance between the two terminals of the memory chip 214 other than a communication partner becomes much lower than an impedance generated by the parasitic capacitance between the drain and source of the FET. Even if the driving circuit 206 applies an AC voltage, the voltage applied between the two terminals of the memory chip 214 can be suppressed to a voltage or lower at which the memory chip 214 stops. In practice, a value obtained by subtracting a voltage drop by the current detection resistor R1 from this voltage represents a voltage applied to the memory chip 214. The memory chip 214 can reliably stay OFF.

For the contact type communication device, various communication methods are proposed depending on the number of signal lines. As the number of signal lines increases, the total cost including cabling and connectors rises. To implement a system at the smallest size and lowest cost, a two-line communication method using two signal lines at minimum is effective. The communication device 201 according to the embodiment can implement two-line data communication without increasing the numbers of driving circuits 206 and reception circuits 208 even when a plurality of cartridges 202 is mounted. The communication device 201 can perform selective data communication by inserting the switching units 207 in only one of the two signal lines. One switching unit 207 is sufficient for one memory chip 214, and this arrangement is advantageous to even cost without increasing the circuit dimension.

<Details of Communication Method>

Details of the communication method will be described. Data communication by downlink and uplink between the driving circuit 206 and the memory chip 214 will be explained. "Downlink" means data transmission from the control circuit 203 to the memory chip 214. "Uplink" means data transmission from the memory chip 214 to the control circuit 203.

(1) Downlink Operation

Figure 3:
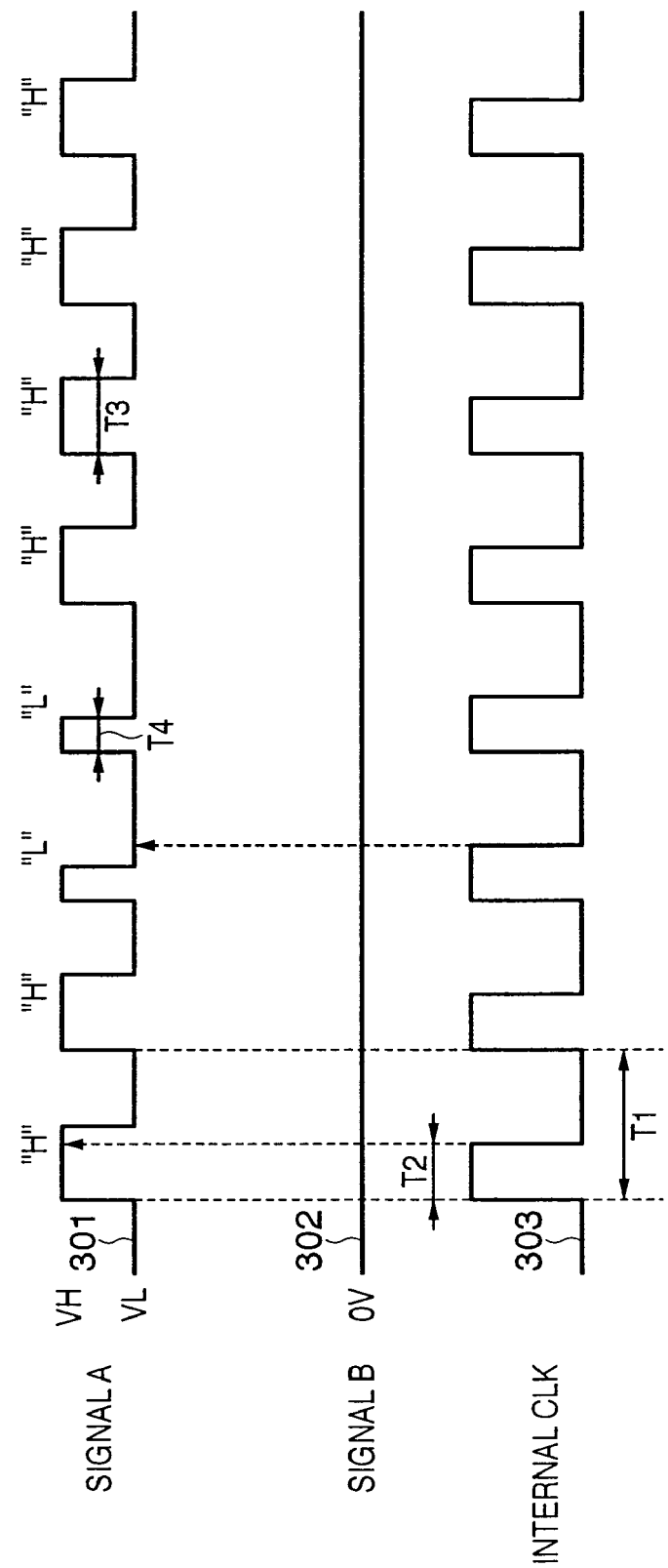
FIG. 3 is a chart showing an example of signals output from a communication device according to the embodiment.

FIG. 3 is a chart showing an example of signals output from the communication device according to the embodiment. Signals output to the first signal line 204 and second signal line 205 in downlink will be explained.

A signal A 301 shown in FIG. 3 is output to the second signal line 205 in downlink. A signal B 302 is output to the first signal line 204 in downlink. An internal CLK 303 is a clock signal generated in synchronism with the leading edge of the signal A 301 within the memory chip 214.

The signal B 302 is grounded via the current detection resistor R1 shown in FIG. 2. The current detection resistor R1 has a small resistance value around several ten Ω for detecting a reception signal, which will be described later. Hence, the signal B 302 functions as a ground signal at almost 0 V. The signal A 301 is an output from the driving circuit 206, and is obtained by superposing information acquired from a data signal on a clock signal. More specifically, as shown in FIG. 3, the signal A 301 is a modulating signal which changes between two values VH and VL at a predetermined cycle T1 (communication frequency). The voltage of the signal A 301 is always equal to or higher than VL.

The internal CLK 303 is an ON duty signal having a predetermined delay T2 from the leading edge of the signal A 301. The time, that is, pulse width during which the signal A 301 is at the voltage VH is adjusted based on output data ("H" or "L"). As shown in FIG. 3, the signal A 301 is adjusted to a pulse width T3 for data "H" and a pulse width T4 for data "L". At this time, it is important to satisfy T4<T2<T3. Each memory chip 214 can receive data by determining whether the signal A 301 is at the level VH or VL when the internal CLK 303 falls.

Figure 4:
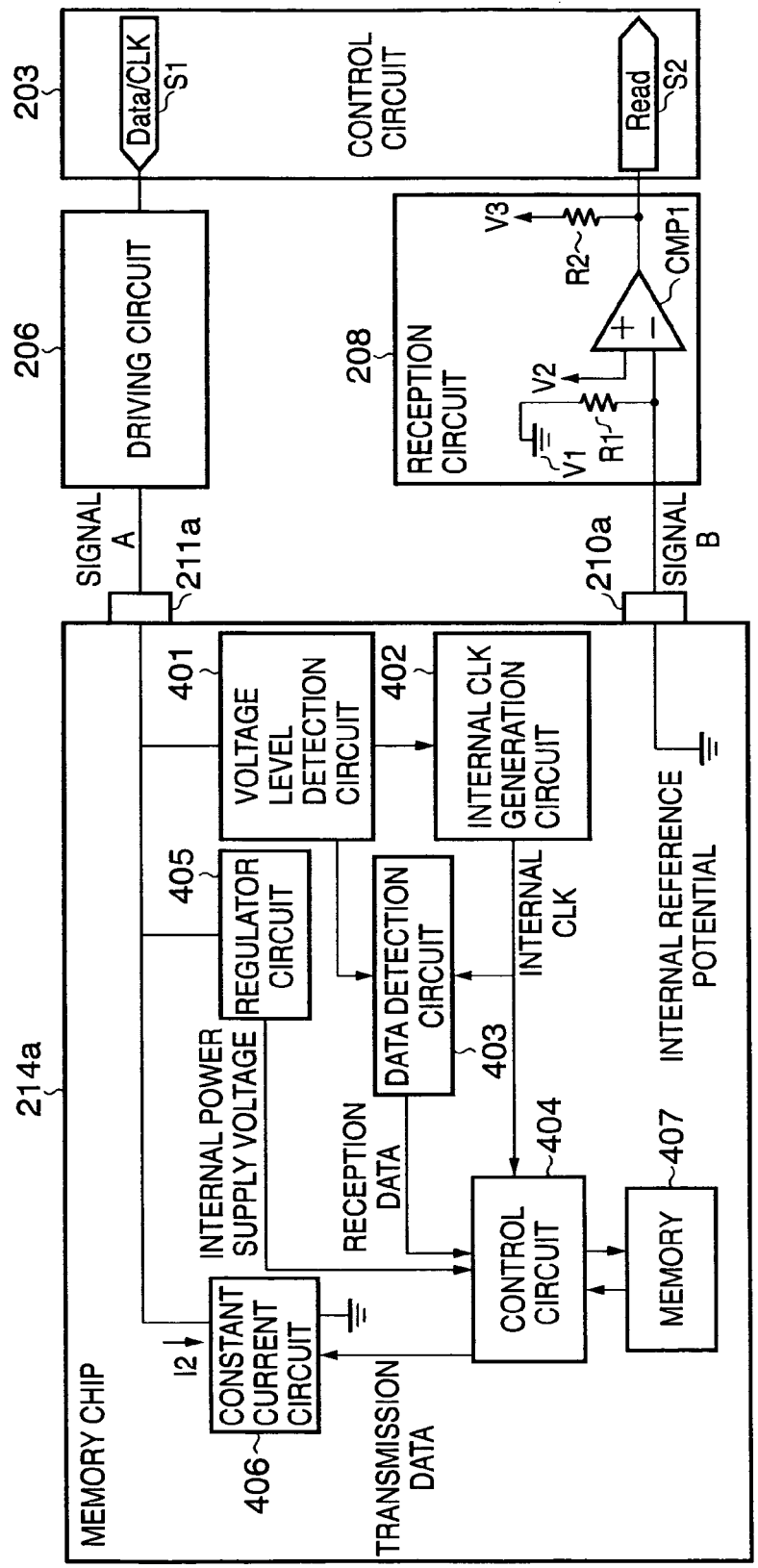
FIG. 4 is a diagram showing an arrangement of a memory chip incorporated in a cartridge according to the embodiment.

An internal operation of the memory chip 214 in downlink will be described with reference to FIG. 4. FIG. 4 is a diagram showing an arrangement of the memory chip incorporated in the cartridge according to the embodiment. The memory chips 214a, 214b, 214c, and 214d have the same arrangement, so the arrangement of the memory chip 214a will be exemplified.

The memory chip 214a comprises a detection circuit 401 for detecting a voltage level, a clock generation circuit 402 for generating an internal CLK, a detection circuit 403 for detecting data, a control circuit 404, a regulator circuit 405, a constant current circuit 406, and a memory 407. The regulator circuit 405 outputs a predetermined voltage. The constant current circuit 406 will be explained in a description of data communication in uplink.

The detection circuit 401 detects the voltage level of the signal A 301 which changes between the two values VH and VL. The clock generation circuit 402 generates the internal CLK 303 in accordance with change of a detection signal output from the detection circuit 401. As shown in FIG. 3, the internal CLK 303 has a pulse width obtained by adding the delay T2 to a leading edge from VL to VH. The detection circuit 403 determines whether an output from the detection circuit 401 is at VH or VL at the falling edge of the internal CLK 303. More specifically, the detection circuit 403 detects data "H" when the signal A 301 has the pulse width T3 and data "L" when it has the pulse width T4. The detection circuit 403 outputs the detection result as reception data to the control circuit 404.

(2) Uplink Operation

Data communication in uplink will be explained with reference to FIGS. 4 and 5. FIG. 5 is a diagram showing an arrangement of a memory chip as a comparative example.

As shown in FIG. 5, a memory chip 500 is connected by two connectors 502 and 503 to a driving circuit 501 including a reception circuit. The memory chip 500 comprises an internal CLK generation circuit 504, data detection circuit 505, control circuit 507, regulator circuit 508, memory 509, switch 510, and resistor 511. The internal CLK generation circuit 504, data detection circuit 505, control circuit 507, regulator circuit 508, and memory 509 perform the same operations as those of the elements shown in FIG. 4.

As shown in FIG. 5, the switch 510 and resistor 511 are series-connected and interposed between two signal lines which transmit signals A and B in the memory chip 500. The control circuit 507 ON/OFF-controls the switch 510 based on data to be transmitted from the memory chip 500 to the driving circuit 501. In response to this, the consumption current of the memory chip 500 changes between two values. The communication device 201 detects the current and can receive data.

In the embodiment, as shown in FIG. 4, the memory chip 214 includes the constant current circuit 406 requiring a current I2. The control circuit 404 in the memory chip 214 ON/OFF-controls the operation state of the constant current circuit 406 based on transmission data, thereby outputting a signal. In addition to the consumption current I2 of the constant current circuit 406, the current is steadily consumed by a logic operation and memory access operation within the memory chip 214. Letting I1 be this current value, the currents of the signals A and B change between the two values I1 and I2. The reception circuit 208 extracts these currents as voltages at the current detection resistor R1. Accordingly, the communication device 201 receives data output from the cartridge 202.

In the embodiment, a memory chip serving as a communication partner is selected by ON/OFF-controlling only one of the two signal lines using FETs in order to communicate with a plurality of memory chips 214. As shown in FIG. 2, the reception circuit 208 is inserted in the other signal line which is not disconnected by the FETs. The reception circuit 208 need not be switched depending on the memory chip 214 serving as a communication partner, and the communication device 201 suffices to include only one common reception circuit 208. The communication device 201 can communicate data with a plurality of cartridges at low cost without increasing the circuit dimension.

It is important for reception based on current detection to connect the condenser 209 to a ground potential V1, as shown in FIG. 2. Assume that the condenser 209 is connected not to the ground potential V1 but to a terminal on the side of the memory chip 214 out of the two terminals of the current detection resistor R1. In this case, an AC current having passed through a capacitive component path formed by the memory chip 214 other than a communication partner and a corresponding switching unit 207 passes through the current detection resistor R1. As a result, the voltage detection margin of a comparator CMP1 decreases. A voltage drop at the current detection resistor R1 becomes large in switching, and the communication waveform distorts, adversely affecting communication.

By connecting the condenser 209 to the ground potential V1, an unnecessary current component passing through the current detection resistor R1 can be reduced to improve the detection precision of the reception circuit 208. The embodiment has described a method of setting a signal having a lower potential out of two transmission signals to a fixed voltage (ground potential V1 shown in FIG. 2), and modulating a signal having a higher potential. However, the same effects can also be attained by setting a signal having a higher potential to a fixed voltage (V1 is not the ground potential but a reference potential), and modulating a signal having a lower potential, details of which will not be described. In the embodiment, a signal on the side of the driving circuit out of two signals is enabled/disabled by the FET. However, the same effects can also be obtained by enabling/disabling a signal on the side of the reception circuit by the FET.

As described above, in the image forming apparatus according to the embodiment, the communication device communicates data with a plurality of cartridges using the two, first and second signal lines. The image forming apparatus includes switching units which connect or disconnect the second signal line. The image forming apparatus can selectively communicate data via the two signal lines, and does not require a plurality of driving circuits corresponding to a plurality of cartridges. The image forming apparatus can, therefore, communicate data with a plurality of cartridges without increasing the circuit dimension. The image forming apparatus can achieve selective data communication by inserting the switching units in only one signal line. Thus, the image forming apparatus can prevent an increase in circuit dimension and reduce the cost.

The present invention is not limited to the above-described embodiment, and can be variously modified. The image forming apparatus may include N charge accumulation units each having one end connected to the first signal line, and the other end connected to a branched second signal line between the second electrode and the switching unit. With this arrangement, the image forming apparatus can further increase the switching precision of the switching unit. The image forming apparatus can selectively communicate data via the two signal lines. The image forming apparatus can communicate data with a plurality of cartridges without increasing the circuit dimension.

The image forming apparatus may further include a reception circuit which is inserted in the first signal line and receives a signal output from the cartridge. Even when the image forming apparatus communicates data with a plurality of cartridges, only one reception circuit inserted in the first signal line can receive a signal output from each cartridge. The image forming apparatus can communicate data with a plurality of cartridges without increasing the circuit dimension.

The reception circuit may also include a current detection resistor connected to the reference potential or ground potential within the reception circuit. In this case, the charge accumulation unit may also be connected to the reference potential or ground potential to which the current detection resistor is connected. In the image forming apparatus, it is also possible to set a signal having a lower potential out of two signals to a fixed voltage, and modulate a signal having a higher potential. In the image forming apparatus, it is also possible to set a signal having a higher potential to a fixed voltage, and modulate a signal having a lower potential. The image forming apparatus enables a flexible design.

According to the embodiment, the switching unit may also be formed from a field-effect transistor (FET). The FET is much smaller in size than a mechanical switch typified by a relay and lower in cost than a selector circuit formed from a semiconductor element, and the circuit arrangement and pattern layout can be designed at high degree of freedom. Even when the image forming apparatus communicates data with a plurality of cartridges, the circuit dimension can be further reduced.

The present invention can provide an image forming apparatus which communicates with a plurality of cartridges without increasing its circuit dimension.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-322522, filed on Nov. 29, 2006, which is hereby incorporated by reference herein in its entirety.

The invention claimed is:

1. An image forming apparatus to which a plurality of cartridges having memories for storing information are detachably mounted, wherein the image forming apparatus communicates with the respective memories of the plurality of cartridges, the apparatus comprising:
   a data transmission unit adapted to transmit a data signal to the memories of the plurality of cartridges;
   a plurality of transmission signal lines adapted to output the data signal from said data transmission unit to the memories of the plurality of cartridges;
   a control unit adapted to output the data signal to said data transmission unit;
   switching units adapted to connect said data transmission unit to one of said plurality of transmission signal lines in accordance with a signal output from said control unit so as to transmit the data signal from said data transmission unit to one of the memories of the plurality of cartridges;
   a data reception unit adapted to receive a data signal transmitted from one of the memories of the plurality of cartridges; and
   a plurality of reception signal lines adapted to transmit a data signal from the memories of the plurality of cartridges to said data reception unit,
   wherein transmitting the data signal to said data reception unit is performed using one of the plurality of reception signal lines which is connected to the memory of the cartridge which can communicate with said data transmission unit in accordance with a connection, performed by said switching units, of said data transmission unit to one of said plurality of transmission signal lines.

2. The apparatus according to claim 1,
   wherein said control unit selectively executes output of the data signal from said data transmission unit and reception of the data signal by said data reception unit.

3. The apparatus according to claim 2, wherein
   the cartridges have first contacts and second contacts,
   said control unit has an output terminal which outputs a clock signal and the data signal to said data transmission unit in order to generate a transmission signal to the cartridges, and an input terminal which receives a signal transmitted from said data reception unit,
   the image forming apparatus further comprises a plurality of connectors having first electrodes which are connected to the first contacts of the plurality of cartridges and second electrodes which are connected to the second contacts,
   the reception signal lines include a reception signal line for connecting the input terminal to the first electrodes, and the transmission signal lines include a transmission signal line for connecting the output terminal to the second electrodes, said switching units are inserted between the output terminal and the second electrodes of the transmission signal, and switch connection states between the second electrodes and said data transmission unit based on a switching signal output from said control unit, and said data transmission unit includes a driving circuit which is interposed between the output terminal and said switching units on the transmission signal line for connecting the output terminal to the second electrodes, supplies power via the transmission signal line to a memory of a cartridge corresponding to a second electrode connected by said switching units, and outputs a transmission signal based on the clock signal and the data signal.

4. The apparatus according to claim 3, further comprising a plurality of charge accumulation units each having one end connected to the reception signal line for connecting the input terminal to the first electrodes, and the other end connected between the second electrode and said switching units on a corresponding transmission signal line.

5. The apparatus according to claim 3, wherein said data reception unit includes a reception circuit which is interposed between the input terminal and the first electrode on the reception signal line for connecting the input terminal to the first electrodes, and receives a signal from a cartridge corresponding to a second electrode connected by said switching units.

6. The apparatus according to claim 5, wherein said reception circuit includes a current detection resistor which is interposed between the first electrode and a reference potential or ground potential in said reception circuit, and detects a current of a transmission signal output from the cartridge to the reception signal line for connecting the input terminal to the first electrodes, and one end of each charge accumulation unit is connected to the reference potential or ground potential to which the current detection resistor is connected.

7. The apparatus according to claim 3, wherein said switching unit includes a field-effect transistor which receives the switching signal at a gate.

8. A communication device which communicates data and is in contact with a plurality of cartridges, the device comprising:

a data transmission unit adapted to transmit a data signal to memories of the plurality of cartridges;

a plurality of transmission signal lines adapted to output the data signal from said data transmission unit to the memories of the plurality of cartridges;

a control unit adapted to output the data signal to said data transmission unit; and switching units adapted to connect said data transmission unit to one of said plurality of transmission signal lines in accordance with a signal output from said control unit so as to transmit the data signal from said data transmission unit to one of the memories of the plurality of cartridges;

a data reception unit adapted to receive a data signal transmitted from one of the memories of the plurality of cartridges; and a plurality of reception signal lines adapted to transmit a data signal from the memories of the plurality of cartridges to said data reception unit, wherein transmitting the data signal to said data reception unit is performed using one of the plurality of reception signal lines which is connected to the memory of the cartridge which can communicate with said data transmission unit in accordance with a connection, performed by said switching units, of said data transmission unit to one of said plurality of transmission signal lines.

9. The device according to claim 8, wherein said control unit selectively executes output of the data signal from said data transmission unit and reception of the data signal by said data reception unit.

* * * * *